United States Patent [19]

Schwarzbich

[11] Patent Number: 5,248,017
[45] Date of Patent: Sep. 28, 1993

[54] ROTATION TRANSMITTING MECHANISM

[76] Inventor: Jörg Schwarzbich, Werther Strasse 15, D-4800 Bielefeld 1, Fed. Rep. of Germany

[21] Appl. No.: 829,281

[22] Filed: Feb. 3, 1992

[30] Foreign Application Priority Data

Feb. 1, 1991 [DE] Fed. Rep. of Germany ... 9101110[U]

[51] Int. Cl.⁵ .............................................. B60T 7/12
[52] U.S. Cl. .................... 192/8 R; 188/134; 297/361.1
[58] Field of Search ............ 192/7, 8 R; 188/134, 188/82.84; 297/361, 362

[56] References Cited

U.S. PATENT DOCUMENTS

| | | | |
|---|---|---|---|
| 1,385,785 | 7/1921 | Hofer et al. | 192/8 R |
| 2,475,159 | 7/1949 | Spraragen | 192/8 R |
| 2,509,541 | 5/1950 | Suska | 192/8 R |
| 2,597,798 | 5/1952 | Houplain | 192/8 R |
| 2,812,044 | 11/1957 | Cole, Jr. | 192/8 R |
| 3,243,023 | 3/1966 | Boyden | 192/8 R |
| 3,319,747 | 5/1967 | Lauper | 192/8 R |
| 4,177,887 | 12/1979 | Kellett et al. | 192/8 R |
| 4,786,110 | 11/1988 | Mahling et al. | 192/8 R X |

FOREIGN PATENT DOCUMENTS 0370502  5/1990  European Pat. Off. .

Primary Examiner—Richard M. Lorence
Attorney, Agent, or Firm—Burns, Doane, Swecker & Mathis

[57] ABSTRACT

A rotation transmitting system comprises drive and driven wheels mounted on a stationary hub for rotation about a common axis. Radially spaced surfaces on the hub and driven wheel form a space in which clamping bodies are mounted. The space includes wedge portions in which the bodies are disposed, and a spring biases the bodies in a locking direction whereby the bodies prevent rotation of the driven wheel in respective directions of rotation. The drive wheel carries a claw member which forces a respective body out of its locking position when the driven wheel is rotated in either direction, thereby unlocking the driven wheel for rotation. A lost-motion connection between the drive and driven wheels connects those wheels for common rotation after the driven wheel has been unlocked.

11 Claims, 3 Drawing Sheets

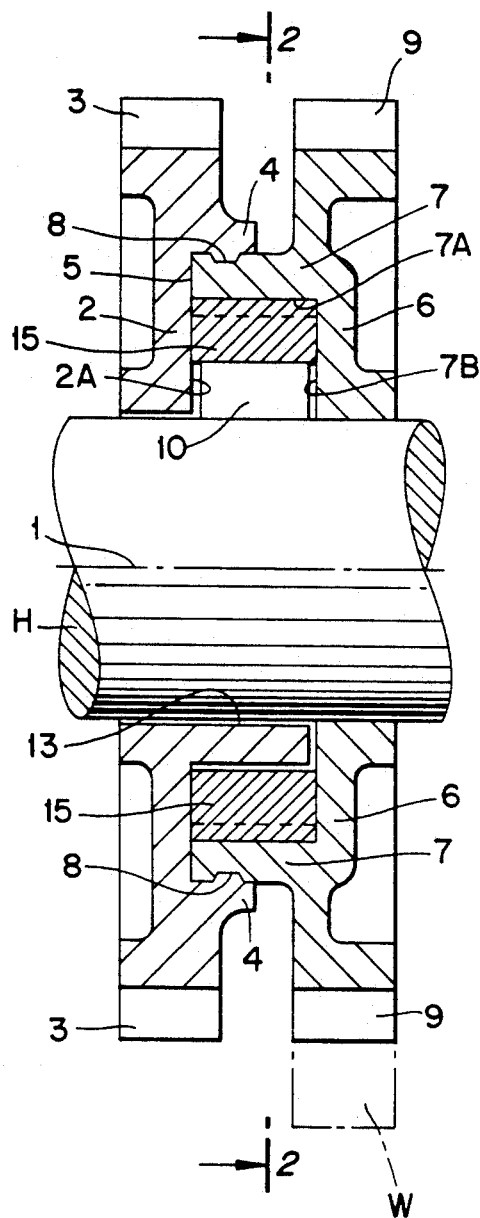
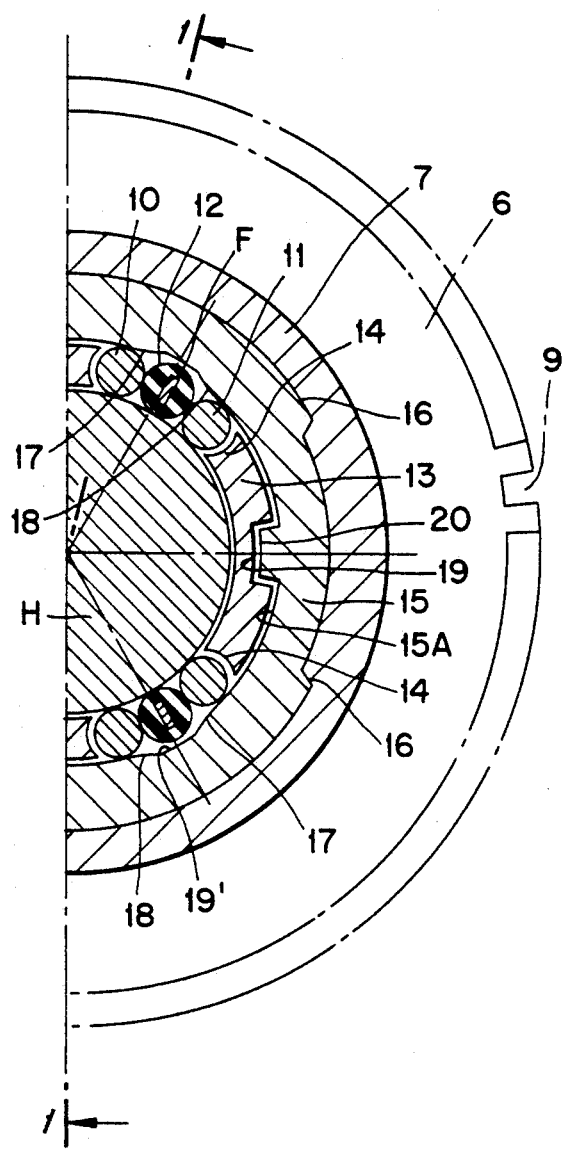

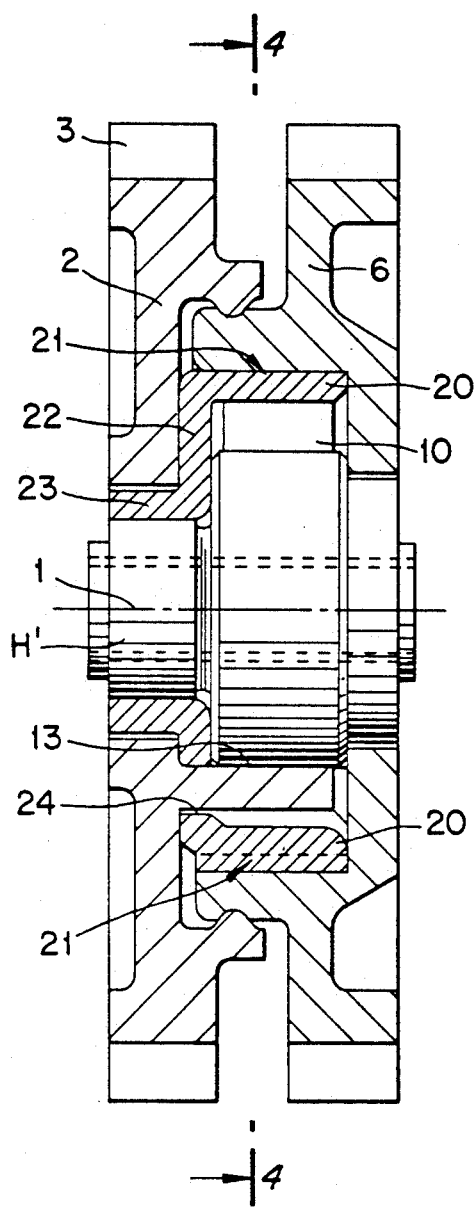
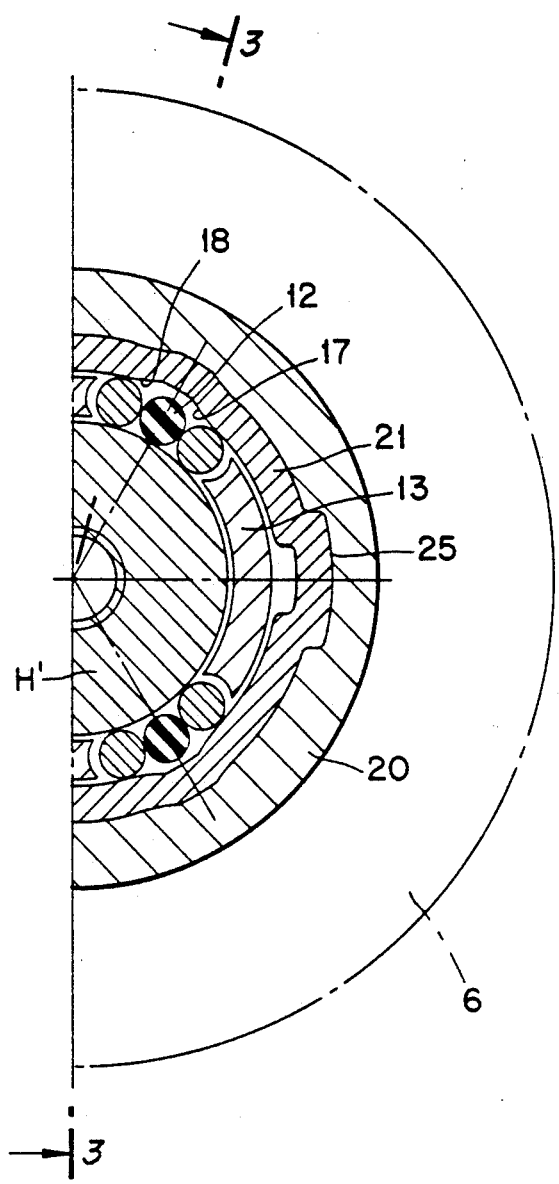

ROTATION TRANSMITTING MECHANISM

BACKGROUND OF THE INVENTION

The invention concerns a rotation transmitting mechanism for the transmission of a rotating motion in both directions of rotation, whereby in case of a flow of force from a driving wheel to the driven wheel, the wheels may freely rotate together in both rotating directions (i.e., so-called free-running), and in the absence of such flow of force, the driven gear is braked against rotation. In particular, the mechanism is to be used for the adjustment of seats of automotive vehicles with there being free running and braking actions in both directions and comprising pairs of clamping bodies pressured by spring elastic elements into a locking position on wedge surfaces and, upon the rotation of the driving wheel, are pressured out from their locking position by claws connected with the driving wheel, wherein the driving wheel meshes eccentrically with internal teeth on the part to be adjusted with a high translation and both the driving and the driven wheel are mounted or seated on a common hub.

Adjusting gears for seats of automotive vehicles are disclosed for example in European Patent Application No. 37 05 02-A2 as comprising a brake and a manual wheel for the actuation of the adjusting gears. The manual wheel is fixedly connected with a brake part, which in a center position immobilizes the adjusting gears and in two mutually pivoted positions releases the adjusting gears for free rotation with the manual wheel. The brake part consists of two coaxially mounted braking parts that may be pivoted relative to each other over predetermined pivoting angles, with one of the parts comprising two spring elements, which in the locking position pressure two roller bodies between clamping surfaces of the braking area and the opposing circular cylindrical surface of the housing. A second braking area has in the center position a plurality of pressure surfaces located at a slight distance from the roller bodies, which upon rotation in each of the two directions release one of the clamping bodies from the clamping position.

In known adjusting gears of this type, of which the one described above is merely an example, the manual wheel is connected to one of the parts to be moved with respect to each other (for example, the frame of the seat), while the driven gear is fixedly connected with the other part to be displaced (for example the frame of the back rest). Here, however, it is necessary to provide another fixed connection, for example with the saucer type gear or mount opposite the saucer shaped gear and mount cover on the seat frame, with the connection to be applied to a plurality of points outside the gears.

It is the object of the invention to develop a mechanism of the above-mentioned generic type which requires significantly less space for installation, relative to known, comparable gears, and consists of fewer parts and therefore may be produced at a lower cost.

SUMMARY OF A PREFERRED EMBODIMENT OF THE INVENTION

To attain this object, the clamping bodies of the preferred embodiment slide on a stationary hub, and the inclined surfaces for the clamping of the free wheel are formed on the inner surface of a ring surrounding the hub. The ring is fixedly connected with the surrounding drive wheel and equipped with claws engaging the recesses of a molded ring for the displacement of the clamping bodies from their clamping position.

Due to the location of the inclined surfaces for the clamping of the clamping bodies on the inner surfaces of a ring surrounding the hub, i.e., on the outer periphery of the free-running layout, it is possible to design the entire gear mechanism in a particularly compact manner and to render the hub stationary, i.e., fixedly anchor it in the frame. In other words, this also signifies that the hub may be located, for example, as the single connection between the saucer type covers of the housing covering the gears and that the hub may additionally be used as the support for a part pivoting relative to the frame. In particular, the hub may be in the form of a sleeve fixedly mounted on the frame, and a drive shaft for another gear or the like, may be inserted through the sleeve. In view of the compact configuration of the entire gear mechanism, the individual parts are smaller, their weight is less and the number of surfaces to be hardened is less, thereby yielding appreciable advantages relative to production and installation. The ring surrounding the hub, on the inner surface of which the inclined surfaces of the clamping bodies of the free run, may be set in a positively locking manner into a toothed driven wheel, or it may be a toothed driven wheel itself.

Importantly, the ring and claws include a lost motion driving connection which positively interconnects the drive wheel and driven wheel for common rotation once the clamping bodies have been shifted from their clamping or braking positions.

The ring surrounding the hub may advantageously be in the form a sleeve having cylindrical portions of large and small diameter, respectively. The small diameter portion is centrally perforated for the passage of the hub or a shaft inserted therein, with which the small diameter portion, possibly by means of a molded-on bush, is fixedly connected. The driving wheel may be located on the bush or the small diameter portion. This embodiment provides the advantage that further support and drive possibilities are present in other locations of the gears, while preserving the compact configuration.

According to an advantageous further development, spring elastic elements are disposed between the clamping bodies which may be held by shoulders of the drive wheel engaging them preferably in a centering manner.

According to another embodiment the spring elastic elements may be molded onto the drive wheel. In a compact configuration, this facilitates assembly.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 1 is a sectional view taken along line 1—1 in FIG. 2, depicting a first embodiment of the invention;

FIG. 2 is a sectional view taken along line 2—2 in FIG. 1;

FIG. 3 is a sectional view taken along line 3—3 of FIG. 4, depicting a second embodiment of the invention;

FIG. 4 is a cross-sectional view taken along line 4—4 in FIG. 3;

DETAILED DESCRIPTION OF PREFERRED EMBODIMENTS OF THE IVNENTION

Figure 5:
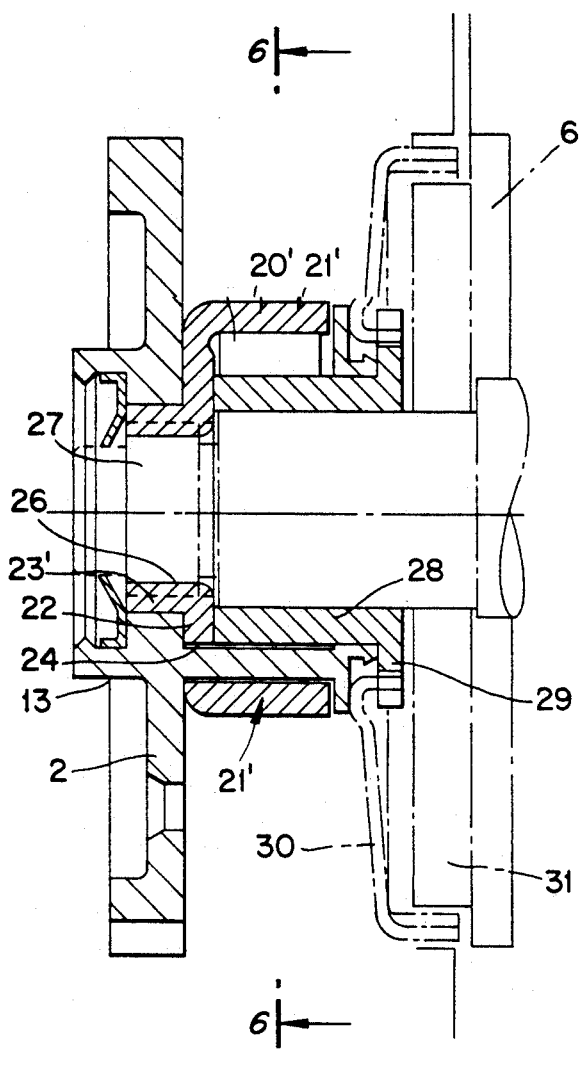
FIG. 5 is a radial sectional view taken along line 5—5 in FIG. 6, depicting a third embodiment of the invention.

According to a first embodiment depicted in FIGS. 1 and 2, a driven wheel 2 is rotatingly mounted on a stationary hub H, the center axis whereof is indicated by the broken line 1 and which may be in the form of a continuous solid axle. The hub H is considered to be stationary in that it is affixed to an adjacent framework. The drive wheel 2 may be equipped directly with an actuating handle (not shown), but it may also be connected by means of its external gear teeth 3 and an intermediate gear meshing therewith, with the manual rotating handle or with a motor drive.

On the drive wheel 2, radially inwardly offset from its outer limit, a concentric annular projection 4 is formed, followed radially inwardly (i.e., toward the rotating axle) by a restriction of recess 5. This restriction 5 is in the form of a shallow annular space broad in the radial direction for holding a brake mechanism (to be explained hereinafter) and a connecting flange of a driven wheel 6. The driven wheel 6 is rotatingly mounted on the hub H and has a projecting annular flange 7 which engages the drive wheel 2 radially inside of the projection 4 of the later, to hold the wheels 2, 6 against relative radial displacement. To connect the two wheels against relative axial displacement, a shoulder 8 is provided on the hub side (i.e., radially inner side of the projection 4). The shoulder 8 corresponds to a recess formed in a radially outer surface of the annular flange 7 of the drive wheel 6, whereby the two shoulders and recesses engage each other in a slightly elastic fashion, such that if the wheels 2 and 6 are pressed toward each other, the shoulders snap into the recesses.

The driven wheel 6 is also provided with gear teeth 9 on its periphery, which engage another gear wheel W, preferably in the form of an internally toothed wheel surrounding the driven wheel eccentrically relative thereto. That other gear wheel W will be driven by the driven wheel 6, preferably at a higher rpm, and will, in turn, displace a part of an automobile seat in a conventional manner.

The radially inwardly facing surface 7A of the flange 7 facing the rotating axle of the driven wheel 6 forms, together with a frontal surface 7B of the driven wheel 6 and the opposing frontal surface 2A of the drive wheel 2, an annular space surrounding the fixed hub. In this annular space are located pairs of clamping bodies in the form of cylinders 10 and 11 mounted in an even distribution around the periphery of the space, directly on the cylindrical surface of the hub. An elastic cylindrical spring element 12 is located between each pair of bodies 10, 11 to pressure the two clamping bodies 10 and 11 circumferentially apart. The spring elements can be attached to the drive wheel or separate therefrom. For example, the drive wheel could have axial fingers F on which the spring elements are mounted. Between these pairs of clamping bodies 10 and 11, the annular space is filled by claws 13 molded of one piece with the drive wheel 2. Those claws 13 have concave frontal surfaces 14, adapted to the roundness of the clamping bodies 10 and 11, while preferably leaving a slight free space between them. That is, the circumferential spacing between successive claws 13 is slightly greater than the total circumferential thicknesses of the bodies 10, 11 and spring element 12.

Within the flange 7 on the driven wheel 6, a ring 15 is located which has external recesses 16 receiving similarly shaped projections on the inside surface of the flange 7 and is therefore positively connected with the driven wheel 6. The inner periphery of the ring 15 includes circular segments 15A interconnected by oblique wedge surfaces 17, 18. The wedge surfaces 17 and 18 are formed on the inside periphery of the ring 15, within the region of the clamping bodies 10 and 11 The radial distance of the circular segments of the inner diameter of the ring 15 from the outer surface of the hub is smaller than the diameters of the clamping bodies 10 and 11, while the wedge surfaoes 17 and 18 encompass the clamping bodies and are interconnected by a surface 19' which is spaced by a radial distance from the outer surface of the hub which is larger than the diameters of the clamping bodies 10 and 11. Hence, the wedge surfaces form wedge portions, each of which has a radially restricted end and a radially enlarged end.

The layout is such that the spring elastic elements 12 located between respective clamping bodies 10 and 11 are pressuring the clamping bodies apart in the narrow portions formed between the oblique surfaces 17 and 18 on the one hand, and the outer surface of the fixed hub H, on the other. The bodies 10 and 11 are therefore pressured into a locking position against the radially restricted ends, wherein the driven wheel 6 is locked against rotation relative to the hub in both directions of rotation. That is, the driven wheel 6 cannot rotate relative to the hub H, because the bodies 10, 11 cannot enter the radially restricted space formed between the outer surface of the hub and the cylindrical segments 15a.

Upon rotation of the manual wheel or motor (not shown) in either direction, a rotation of the drive wheel 2 relative to the driven wheel takes place, whereupon the clamping bodies 10 (or 11) locking the driven wheel against rotation are pressured out of their locking position by the claws 13. That is, if the drive wheel 2 is rotated clockwise as viewed in FIG. 2, then the claws 13 would push the bodies 10 clockwise and into the radially enlarged unlocking space formed between the hub H and the surface 19', whereupon the driven wheel 6 can rotate relative to the hub. To ensure that the driven wheel then rotates uniformly with the drive wheel, radial recesses 19 are provided in the claws 13 to be engaged by radial projections 20 on the ring 15. The connection 19, 20 constitutes a "lost motion" connection in that the recesses are circumferentially longer than the projections 20, making possible the displacement of the claws 13 relative to the ring 15 upon the initiation of the rotating motion, whereby the clamping body 10 or 11 is pressured out of its clamping position before the surfaces of the projections and recesses become mutually engaged. The circumferential spacing between the surfaces of the projections 20 and recesses 19 are greater than the circumferential spacing between the bodies 10, 11 and the claws 13 to permit the claws to push the bodies 10 (or 11) into the unlocking space before the surfaoes of the projections 20 and recesses 19 come into contact with one another.

Although the ring 15 is disclosed as being formed separately of the driven wheel 6, it is possible to form the ring 15 and wheel 6 of one piece. The separate-piece arrangement merely facilitates projection and assembly.

In a second embodiment according to FIGS. 3 and 4, identical parts are identified by the same reference symbols, and only the differences are described hereinafter. In place of the ring 15 in this embodiment, a deepdrawn sheet metal sleeve 21 is set into the driven wheel 6. The sleeve 21 includes a first cylindrical portion 20 which is affixed to the driven wheel 6 and performs the same function as the previously described ring 15. The sleeve includes a smaller diameter second cylindrical portion 23 forming a center recess which on the one hand is rotatingly supported on the stationary hub H', and on the other hand, forms a radial bearing support for the drive wheel 2.

The hub H' is shaped correspondingly to the shapes of the cylindrical portions 20, 23. A radial flange 22 projects radially outwardly from one end of the cylindrical portion 23 and forms an axial bearing surface for the drive wheel 2. The radial flange 22 includes circumferentially spaced passages 24 through which the claws 13 extend. The passages are slightly wider in the circumferential direction than the claws 13, so that there may occur the necessary rotation of the drive wheel 2 relative to the cylindrical portion 20 in order to enable the bodies 10 or 11 to be moved to their unlocking positions. The cylindrical portion 20 also includes a lost motion connection (not shown) similar to that disclosed at 19, 20 in FIGS. 1, 2.

As the sleeve 21 is precisely stamped, it may be provided on the one hand on the inner surface of its cylindrical area 21 with the oblique surfaces 17 and 18 for the clamping of the clamping bodies, and on the other, with outwardly directed deformations 25 set in a positively locking manner into corresponding recesses in the inside of the flange 7 of the driven wheel 6.

In the third embodiment according to FIGS. 5 and 6 again identical parts are identified by the same reference symbols. The second embodiment according to FIGS. 3 and 4 is further developed as follows: the sleeve 21' is provided with internal teeth 26 on its cylindrical portion 23'. The teeth are connected to teeth or shoulders formed on an external surface of an inner shaft 27. The cylindrical portion 20' of the sleeve 21' is connected to the driven wheel 6'. The shaft 27 is rotatably mounted within the hub 28 for rotation relative thereto. The hub 28, which is in the form of a hollow tube, includes a radially outward projecting flange 29 connected to fastening clamps 30, the latter being fixedly with frame 31. Between the outer surface of the stationary hub 28 and the oblique surfaces 17 and 18 on the sleeve 21', the roll bodies 10 and 11 are located. The sleeve 21, is connected to the driven wheel for rotation therewith. Also, a lost motion connection (not shown) is provided in this embodiment.

Figure 6:
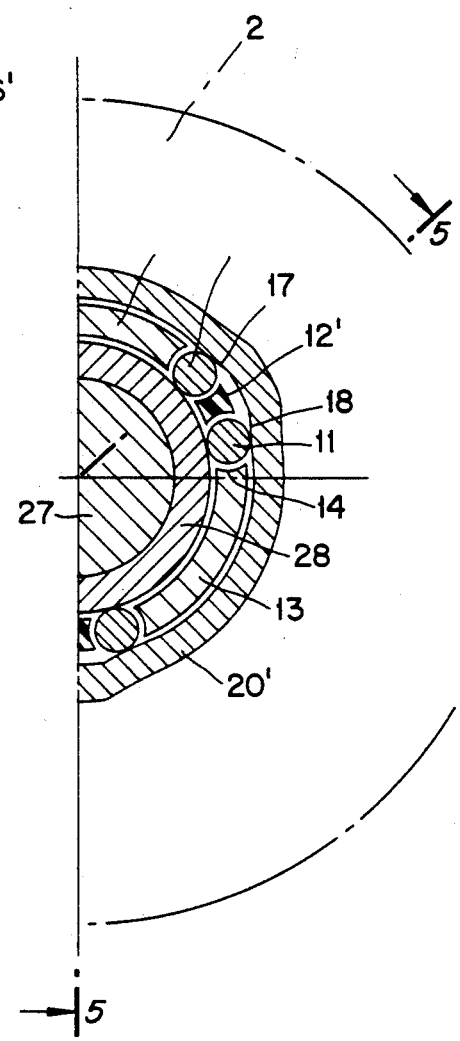
FIG. 6 is a cross-sectional view taken along line 6—6 in FIG. 5.

The spring 12' as depicted in FIG. 6 is of a different, alternative shape as compared with the cylindrical shape shown in FIGS. 1-4. The spring 12' present a larger contact area with the bodies 10, 11.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A rotation transmitting system, comprising:
    a hollow cylindrical stationary member having a radially outwardly facing first surface generated about an axis;
    rotary drive means and rotary driven means mounted for rotation about said axis, said driven means including a shaft rotatable about said axis and extending through said stationary member, said driven member also including a sleeve having first and second cylindrical protions, said first portion extending coaxially around said shaft and joined thereto for common rotation, said second portion of said sleeve including a radially inwardly facing second surface generated about said axis and facing said first surface,
    said first and second surfaces being spaced apart radially with reference to said axis to form a circumferentially extending space therebetween,
    said space including first and second wedge portions, each said wedge portion extending circumferentially and being of gradually radially expanding dimension so as to present a radially enlarged end and a radially restricted end, said first wedge portion expanding radially in one circumferential direction, and said second wedge portion expanding radially in an opposite circumferential direction;
    first and second bodies disposed within said first and second wedge portions, respectively, each of said first and second bodies being circumferentialy movable within its associated wedge portion between said radially enlarged and radially restricted ends of said respective wedge portion,
    said first and second bodies being larger than said first and second restricted ends and smaller than said enlarged ends, so that rotation of said driven means relative to said first surface ineither direction of rotation is prevented by a respective one of said first and second bodies when said respective body is located at the restricted end of its associated wedge portion, and such rotation is permitted when said respective body is located at the enlarged end of its associated wedge portion; and
    biasing means for yieldably biasing said first and second bodies circumferentially toward said restricted ends of their respective wedge portions;
    said rotary drive means including body-moving means disposed in said space for displacing said first body toward said enlarged end of its associated wedge portion when said rotary drive means is rotated by a predetermined distance in one direction, and for displacing said second body toward said enlarged end of its associated wedge portion when said rotary drive means is rotated by a predetermined distance in the opposite direction;
    said rotary drive means and rotary driven means including a lost-motion connection therebetween for permitting said rotary drive means to rotate relative to said rotary driven means by said predetermined distance in both directions of rotation, and then positively connecting said rotary drive means and rotary driven means for common rotation.

2. Apparatus according to claim 1, wherein said biasing means comprises an elastic spring member.

3. Apparatus according to claim 2, wherein said spring member is disposed circumferentially between said first and second bodies for biasing said first and second bodies in circumferentially opposite directions.

4. Apparatus according to claim 2, wherein said spring member is joined to said drive means.

5. Apparatus according to claim 1, wherein said body-moving means comprises a segment of a cylinder formed coaxially about said axis.

6. Apparatus according to claim 1, wherein there is provided a plurality of pairs of said first and second bodies mounted in respective wedge portions, and a plurality of said body-moving means for moving said bodies.

7. Apparatus according to claim 1, wherein said bodies are configured as cyilndrical rollers.

8. Apparatus according to claim 1, whereinsaid system comprises a portion of an automobile seat adjusting mechanism.

9. Apparatus according to claim 1 wherein said first portion of said sleeve includes radially inwardly projecting teeth meshing with radially outwardly projecting teeth of said shaft.

10. Apparatus according to claim 9 wherein said first portion of said sleeve is of smaller diameter than said second portion.

11. Apparatus according to claim 1 wherein said first portion of said sleeve is of smaller diameter than said second portion.

* * * * *